No. 812,360. PATENTED FEB. 13, 1906.
T. W. PARKS.
AUXILIARY VEHICLE SEAT.
APPLICATION FILED MAR. 9, 1905. RENEWED JAN. 9, 1906.
2 SHEETS—SHEET 1.
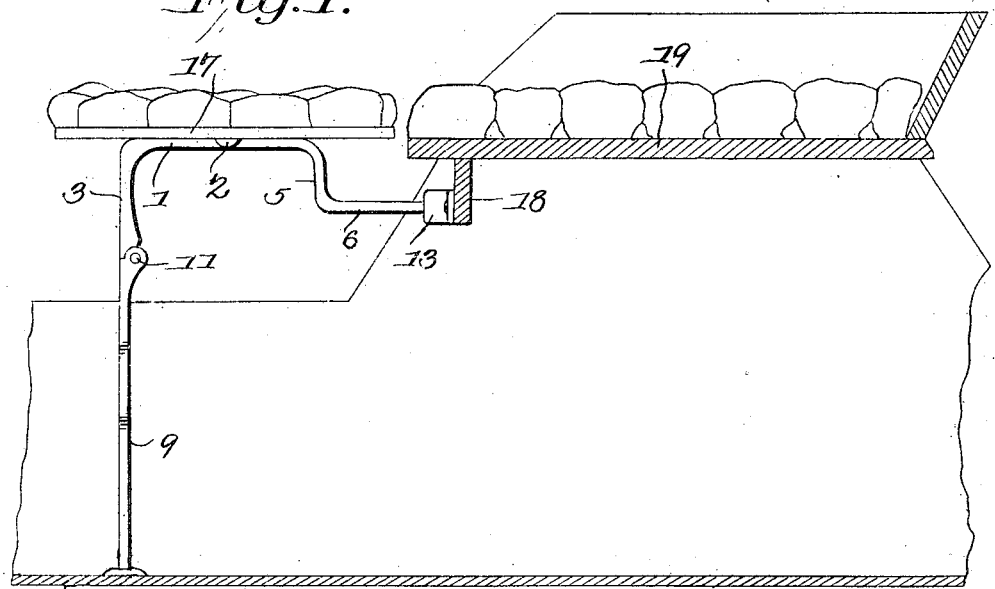
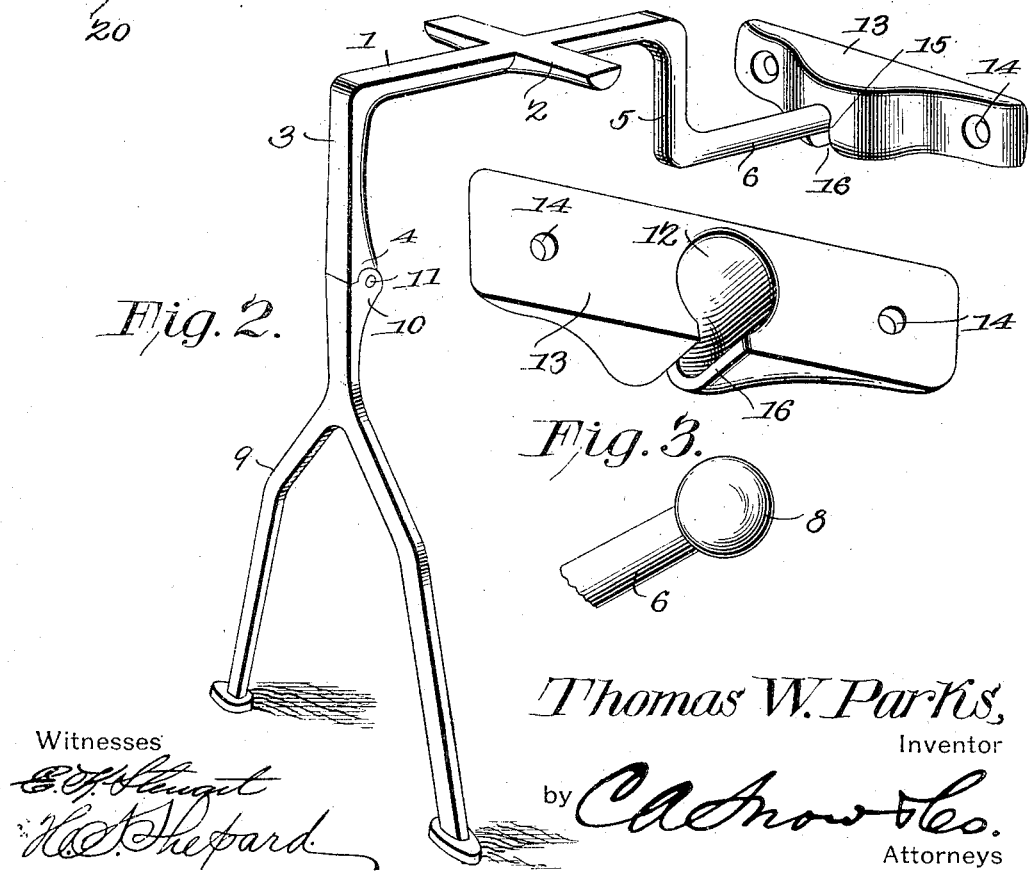
Witnesses
Thomas W. Parks,
Inventor
by C. A. Snow & Co.
Attorneys

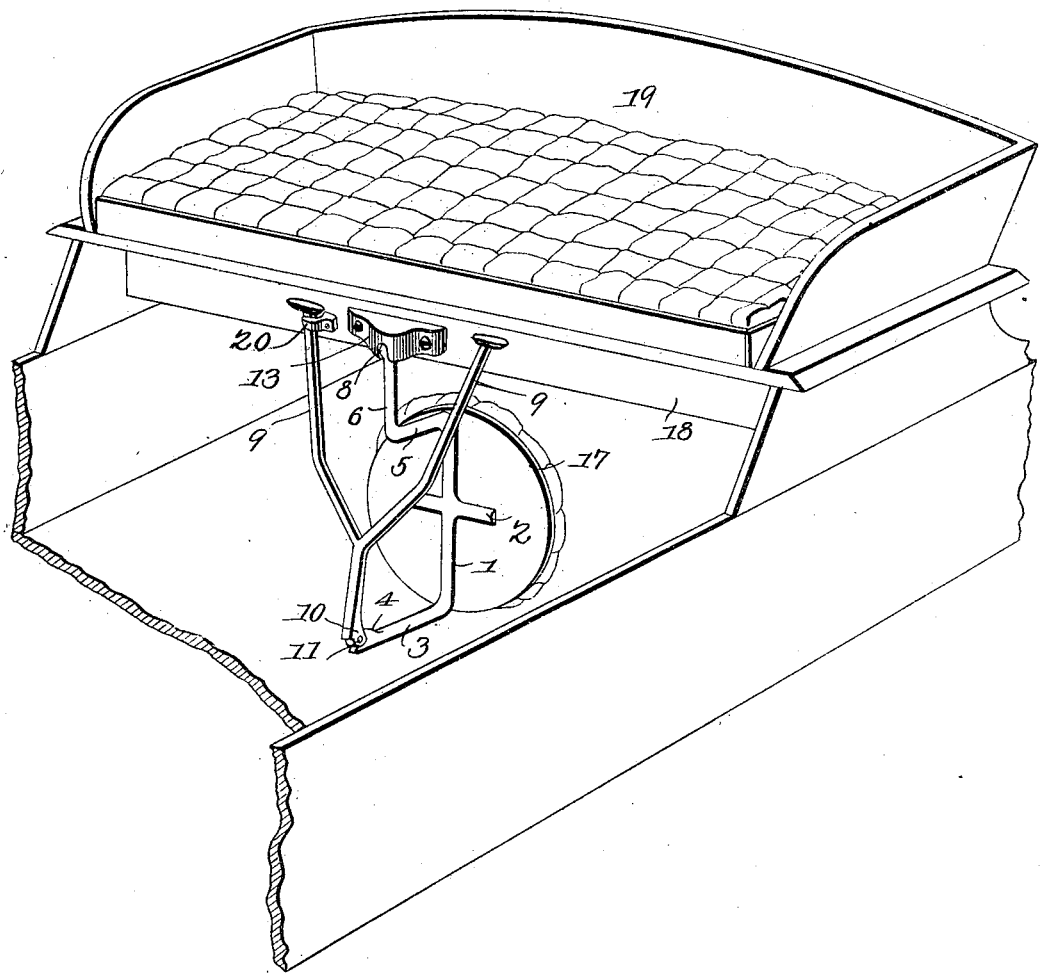

UNITED STATES PATENT OFFICE.

THOMAS W. PARKS, OF ALEXANDRIA, INDIANA, ASSIGNOR OF ONE-HALF TO WALTER B. CHENOWETH, OF ALEXANDRIA, INDIANA.

AUXILIARY VEHICLE-SEAT.

No. 812,360.  Specification of Letters Patent.  Patented Feb. 13, 1906.

Application filed March 9, 1905. Renewed January 9, 1906. Serial No. 295,302.

*To all whom it may concern:*

Be it known that I, THOMAS W. PARKS, a citizen of the United States, residing at Alexandria, in the county of Madison and State of Indiana, have invented a new and useful Auxiliary Vehicle-Seat, of which the following is a specification.

This invention relates to auxiliary seats for vehicles, and has for its object to provide certain new and useful improvements in the construction and mounting of such seats, whereby they may be collapsed and located beneath the usual seat out of the way when not in use and at the same time capable of being readily set up in position for use.

Another object of the invention is to have the present seat complete in itself and capable of being conveniently attached to a vehicle without altering or changing the latter in any manner whatsoever.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the accompanying drawings, Figure 1 is a fragmentary longitudinal sectional view taken through a vehicle-body and the seat thereof with the auxiliary seat of the present invention shown in position for use. Fig. 2 is a detail perspective view of the seat-supporting means of the present invention. Fig. 3 is a detail perspective view showing the ball-and-socket members of the supporting device. Fig. 4 is a perspective view of a portion of a vehicle-body, showing the auxiliary seat folded beneath the main seat.

Like characters of reference designate corresponding parts in each and every figure of the drawings.

The device of the present invention includes a substantially horizontal seat-bracket 1, having an intermediate cross-head or cross-bar 2 projecting at opposite sides thereof and provided at its forward end with a pendent standard member 3, terminating at its lower end in a hinge-knuckle 4. The rear end of the bracket member 1 is provided with a pendent standard 5, having a substantially horizontal stem member 6 extending rearwardly from the lower end thereof and terminating in a cylindrical head 8. An arched or forked leg-standard 9 has its upper end terminating in a hinge-knuckle 10, which is connected to the hinge-knuckle 4 by a suitable pintle 11, this hinge-joint being in the nature of a butt-hinge capable of breaking forwardly, but not rearwardly. The cylindrical head or ball 8 is designed to rotatably fit within a socket 12 in an attaching-bracket 13, the opposite ends of which are pierced by suitable perforations 14 for the reception of fastenings, the front of the socket being intersected by an upright slot 15 and its bottom by a horizontal slot 16, communicating with the lower end of the slot 15. A suitable seat-bottom 17, upholstered or otherwise, is secured flat upon the top of the bracket 1 and its cross-head 2.

In practice the cylindrical head or ball 8 is engaged with the socket 12 of the bracket 13, and the latter is then secured to the front face of the front cross-sill 18 of any ordinary vehicle-seat 19 with the slot 16 at the lower side of the bracket. The seat-bracket 1 is then brought into a substantially horizontal position in front of the vehicle-seat 19, with the leg-standard 9 resting upon the bottom of the vehicle-bed 20, whereby the auxiliary seat 17 is supported in a substantially horizontal position immediately in front of the main seat 19. By preference the bracket 13 is located about midway of the ends of the main seat in order that the auxiliary seat may be located between two occupants of the main seat.

When the auxiliary seat is not in use, as in Fig. 4 of the drawings, the leg-standard 9 is folded rearwardly and upwardly, and then the seat-bracket is rotated in the socket 12 to bring the auxiliary seat upon the under side of the bracket, with the leg-standard 9 uppermost, whereupon the seat-bracket is swung downwardly and rearwardly to locate the auxiliary seat beneath the main vehicle-seat, the free ends of the forked members of the leg-standard 9 being brought against the front of the cross-sill 18 of the main buggy-seat and held thereagainst by means of a turn-button 20, pivotally applied to the front of the sill 18, thereby to hold the auxiliary seat in a rigid condition when folded, so as to prevent rattling and looseness thereof. In the folded condition of the auxiliary seat the usual fall or curtain, (not shown,) which is carried by the front edge of the vehicle-seat, may be dropped down in the ordinary manner without being interfered with by the auxiliary seat.

Having thus described the invention, what is claimed is—

1. The combination with a vehicle-seat, of a bracket secured thereto, a seat-bracket having a universal connection with the first-mentioned bracket to permit folding of the seat-bracket beneath the main seat, and a foldable prop for the seat-bracket.

2. The combination with a vehicle-seat, of a bracket secured thereto and provided with a socket intersected in its front by an upright slot and in its bottom by a horizontal slot communicating with the upright slot, a substantially horizontal seat-bracket having a ball working in the socket of the first-mentioned bracket, and a foldable prop carried by the seat-bracket.

3. An auxiliary seat for vehicles comprising a substantially horizontal seat-bracket having a pendent standard at its front end and a rearwardly-extending stem at its other end, said stem terminating in a ball, an attaching-bracket having a socket for the loose reception of the ball, and a prop member hinged to the standard of the seat-bracket.

4. The combination with a vehicle-seat, of an auxiliary seat including a seat-bracket having a universal connection with the vehicle-seat and a foldable leg-standard for the bracket, the bracket capable of being inverted and swung back beneath the vehicle-seat when the leg-standard is folded against the bracket, and means carried by the vehicle-seat for engagement with the leg-standard in the folded condition of the auxiliary seat to hold the latter against looseness.

5. The combination with a vehicle-seat, of an auxiliary seat including a seat-bracket having a universal connection with the vehicle-seat and a foldable leg-standard for the bracket, the bracket capable of being inverted and swung back beneath the vehicle-seat when the leg-standard is folded against the bracket, and a turn-button mounted upon the vehicle-seat in position to engage the leg-standard of the auxiliary seat in the folded condition thereof to hold the same against looseness.

In testimony that I claim the foregoing as my own I have hereto affixed my signature in the presence of two witnesses.

THOMAS W. PARKS.

Witnesses:
  DANIEL DAVIS,
  F. L. KERR.